United States Patent
Shi et al.

(10) Patent No.: US 9,975,209 B2
(45) Date of Patent: May 22, 2018

(54) ADJUSTABLE ROLLER CARRIER

(71) Applicant: Chengdu Alangtech Co., Ltd., Chengdu (CN)

(72) Inventors: Changyu Shi, Chengdu (CN); Zhihui Peng, Chengdu (CN); Zhixiang Peng, Chengdu (CN)

(73) Assignee: Chengdu Allangtech Co., Ltd., Chengdu (CN)

( * ) Notice: Subject to any disclaimer, the term of this patent is extended or adjusted under 35 U.S.C. 154(b) by 0 days. days.

(21) Appl. No.: 14/411,909

(22) PCT Filed: Jun. 21, 2013

(86) PCT No.: PCT/CN2013/077693
§ 371 (c)(1),
(2) Date: Dec. 29, 2014

(87) PCT Pub. No.: WO2014/000604
PCT Pub. Date: Jan. 3, 2014

(65) Prior Publication Data
US 2015/0165567 A1    Jun. 18, 2015

(30) Foreign Application Priority Data
Jun. 30, 2012 (CN) .................. 2012 2 0312907 U

(51) Int. Cl.
*B25B 1/00* (2006.01)
*B23K 37/053* (2006.01)
(Continued)

(52) U.S. Cl.
CPC ........ *B23K 37/0538* (2013.01); *B23K 31/027* (2013.01); *F16C 35/042* (2013.01); *B23K 2201/06* (2013.01); *B23K 2203/04* (2013.01)

(58) Field of Classification Search
CPC ............ B23Q 1/40; B23Q 1/105; B21C 37/06
(Continued)

(56) References Cited

U.S. PATENT DOCUMENTS 4,236,859 A * 12/1980 Stearn .................. B63C 3/12
                                                    254/281
5,934,626 A    8/1999 Collins, Jr.
(Continued)

FOREIGN PATENT DOCUMENTS

CN         201120538 Y     9/2008
CN         201596882 U    10/2010
(Continued)

OTHER PUBLICATIONS

International Search Report for PCT/CN2013/077693 (WO2014/000604 A1); dated Sep. 10, 2013; 6 pgs.
(Continued)

*Primary Examiner* — David Bryant
*Assistant Examiner* — Nirvana Deonauth
(74) *Attorney, Agent, or Firm* — Andrew D. Fortney; Central California IP Group, P.C.

(57) ABSTRACT

Disclosed is an adjustable roller carrier, comprising a roller carrier base (1), rollers (2) and a motor speed reducing driver, wherein both ends of the roller carrier base are each articulated with a roller bearing (3) and a roller carrier hydraulic jack (5), with the roller carrier hydraulic jack (5) being articulated with the roller bearing (3) and the roller (2) being mounted on the roller bearing. The roller carrier hydraulic jack and a hydraulic pump station thereof, and an electromagnetic valve are all placed inside a hollow roller carrier support so that not only the height and the center-to-center distance of the rollers are adjustable, but also the adjustable roller carrier has the advantages of being integrally compact in structure, and small in terms of occupied
(Continued)

space. The adjustable roller carrier enables the steel pipe to rotate in a narrow space, can be fast lifted, and transported by railway. The adjustable roller carrier is convenient to operate and has high safety.

14 Claims, 2 Drawing Sheets

(51) Int. Cl.
  *B23K 31/02* (2006.01)
  *F16C 35/04* (2006.01)
  *B23K 101/06* (2006.01)
  *B23K 103/04* (2006.01)
(58) Field of Classification Search
  USPC .................................................. 269/289 MR
  See application file for complete search history.

(56) References Cited

U.S. PATENT DOCUMENTS

| | | | | |
|---|---|---|---|---|
| 6,279,685 | B1 * | 8/2001 | Kogan | B66F 7/28 |
| | | | | 187/203 |
| 6,375,178 | B1 * | 4/2002 | Schilb | B23Q 1/66 |
| | | | | 269/71 |
| 7,097,406 | B1 * | 8/2006 | Gang | B60B 29/002 |
| | | | | 254/105 |
| 8,118,293 | B1 * | 2/2012 | Barger | B23Q 7/05 |
| | | | | 144/287 |
| 8,690,479 | B2 | 4/2014 | Peng | |
| 2004/0217531 | A1 * | 11/2004 | Yates | B25B 1/125 |
| | | | | 269/184 |
| 2008/0093787 | A1 * | 4/2008 | Dailey | H02K 15/0006 |
| | | | | 269/269 |
| 2011/0023677 | A1 * | 2/2011 | Rundell | B26D 7/02 |
| | | | | 83/459 |
| 2011/0203100 | A1 | 8/2011 | Peng | |
| 2012/0091645 | A1 * | 4/2012 | Haynes | B25B 11/00 |
| | | | | 269/58 |
| 2012/0098180 | A1 * | 4/2012 | Kawakami | B23Q 1/009 |
| | | | | 269/20 |

FOREIGN PATENT DOCUMENTS

| | | |
|---|---|---|
| CN | 201900418 U | 7/2011 |
| CN | 102717223 A | 10/2012 |
| CN | 202639740 U | 1/2013 |
| DE | 3226087 A1 | 1/1984 |

OTHER PUBLICATIONS

WO2014/000604 A1; Mar. 1, 2014; 11 pgs.; World Intellectual Patent Office.
Written Opinion of the International Searching Authority with partial English translation for PCT/CN2013/077693; dated Oct. 3, 3013; 9 pgs.
Changyu Shi and Zhihui Peng; "Adjustable Rolling Wheel Frame"; Abstract of CN202639740 (U); Jan. 2, 2013; 2 pgs.; Espacenet.
Changyu Shi and Zhihui Peng; "Adjustable Roller Carrier"; Abstract of CN102717223 (A); Oct. 10, 2012; Espacenet.
Zhang Yong, Zhao Xuping and Liang Xiaoyu; "Welding Roll Frame"; Abstract of CN201120538 (Y); Sep. 24, 2008; Espacenet.
Zhou Xiaoguang, Kang Wenbin and Xu Peng; "Welding Roller Bracket Capable of Aligning"; Abstract of CN201900418 (U); Jul. 20, 2011; Espacenet.
Bibliographic Data of CN201596882 (U); Oct. 6, 2010; Espacenet.
Franz Haane; "Device for the Support of Boilers, Pipes and Similar Cylindrical Workpieces in Welding Work and Cutting Work"; Abstract of DE3226087 (A1); Jan. 19, 1984; 2 pgs.; Espacenet.

* cited by examiner

ADJUSTABLE ROLLER CARRIER

TECHNICAL FIELD

This invention relates to a roller carrier, especially an adjustable roller carrier.

BACKGROUND

A roller carrier is a device which drives the cylindrical (or conical) weldment to rotate by the friction force between the weldment and driving rollers. The roller carrier can be categorized into self-aligning type, adjustable type, flatcar type, inclinable type, anti-axial shifting type and etc., among which the adjustable roller carrier comprises a roller carrier base, driving roller components and driven roller components. Currently, the adjustable roller carrier has three types, including manual lead-screw adjustable type, manual bolt displacement type and electric sliding plate displacement type, which all of these are satisfied weldment with different diameters by adjusted the center-to-center distance of rollers manually. Since all the existing adjustable roller carriers have defects of being large in structure and high in center height, manual or electric sliding plate adjustment structure causes the steel pipe to lift slowly; and the upper surface of the roller carrier base is horizontal, so weldment with large diameter is not stable and easy to roll when placed on the roller carrier. Though, under special environment, such as inside a tunnel, the operation position and space are restricted strictly, the current roller carriers cannot meet the operation requirements, which limits the application of the roller carriers.

SUMMARY OF THE INVENTION

For overcoming the defects of prior product art said above, the invention provide an adjustable roller carrier which can not only adjust the center-to-center distance and height of the rollers but also has the advantages of being compact in structure and small in terms of occupied space, enabling the steel pipe to be rotated in a narrow space, to be lifted fast, and to be transported by railway, operating convenient and high safety, extending the application range of the adjustable roller carrier, and improving the quality and efficiency of the steel pipe welding inside a tunnel or similar site where space is restricted.

To realize above said aim, the technical solution of this invention is as follows:

An adjustable roller carrier, compromising a roller carrier base, rollers, roller carrier rail wheels and a motor speed reducing driver, characterized in that both ends of the roller carrier base are each articulated with a roller bearing and a roller carrier hydraulic jack, with the roller carrier hydraulic jack being articulated with the roller bearing and the roller being mounted on the roller bearing.

Preferably, the said roller bearing is a triangular articulated structure.

Preferably, the said roller carrier is driving roller carrier or driven roller carrier, with driving roller rotation electric motor installed on either both ends or one end of the rollers of the driving roller carrier.

The function of the driving roller rotation electric motor is to drive the driving roller to rotate around the shaft. The function of the hydraulic jack on the driving roller carrier is to drive the roller bearing to rotate around the articulated shaft at the bottom of the roller carrier base so as to realize the height change of the driving roller and the adjustment of the horizontal center-to-center distance. Since the driven roller is to assist with supporting the weldment, the driven roller rotation electric motor is not necessary to be set. The function of the hydraulic jack on the driven roller carrier is the same as on the driving roller.

Preferably, upper surface of said roller carrier base is a concave arc from the middle to both ends.

The steel pipe weldment with arc structure has more contact area than on the base with horizontal structure. When it is placed on the roller carrier base, the height of the weldment is reduced so it is more accurate, convenient and fast for the roller to align the weldment. The weldment is more stable to be rotated on the arc structure base when it is machined, and the effect is particularly obvious the larger the diameter of the weldment.

Preferably, said roller carrier base is hollow.

Preferably, said roller carrier hydraulic jack is installed inside the roller carrier base and this roller carrier hydraulic jack is driven by the external electric hydraulic pump and equipped with relevant hydraulic valve or electromagnetic valve.

Preferably, said roller carrier hydraulic jack is installed inside the roller carrier base and the roller carrier hydraulic jack is connected with the electric hydraulic pump and hydraulic valve that are both installed inside the roller carrier base, and equipped with corresponding contactor or electromagnetic valve, as well as the remote controller connected with the contactor or electromagnetic valve.

It is to reduce the structure size of the roller carrier by installing electric hydraulic pump, hydraulic valve and electromagnetic valve inside the driving roller carrier base and the driven roller carrier base, and it enables the driving roller carrier hydraulic jack or driven roller carrier hydraulic jack to extend or shorten by controlling electric hydraulic pump with electromagnetic valve remote controller so that the operation is more convenient.

Preferably, roller carrier rail wheels are installed on both ends of the bottom of the roller carrier base and the roller carrier rail wheel electric motor is installed on the said roller carrier rail wheel Preferably, said driving roller carrier rotation motor is servo motor or frequency conversion motor with encoder closed-loop feedback controller.

To sum up, according to above technical solution, the benefits of the invention is that rollers rotates around the roller carrier base, with the detailed realization process is that remote controller controls the electric hydraulic pump thus it controls the extension or shortening of the two hydraulic jacks of the roller carrier; the driving roller carrier hydraulic jack drives the driving roller bearing to move via connection shaft of the driving roller carrier hydraulic jack, and then the driving roller bearing rotates around the bearing shaft of driving roller so that the driving roller bearing drives the driving roller to rotate around the driving roller carrier base. The principle for the driven roller is the same. Since these two roller device can rotate at the same time, the height and center-to-center distance of these two rollers can be adjusted, the large stroke fast lifted and small amount of horizontal adjustment of the steel pipe can be achieved. The experiment data shows that the with the jack stroke of 200 mm, the driving roller or the driven roller can rise 400 mm or even higher. Furthermore, with the arc base, this roller carrier reduces the height of the structure itself as well as the height of the steel pipe weldment. It is more accurate, convenient and faster for the roller to align the weldment. And it is more stable to machine the weldment placed on the arc structure and the roller carrier is able to support weldment of different diameters. The roller carrier hydraulic jack, the hydraulic pump station and the electromagnetic valve are all placed inside the roller carrier base, optimizing the overall space dimensions of the roller carrier. Besides, the roller carrier is equipped with rail wheel, so it is very convenient to move without being restricted by the operation and welding space position, much suitable for welding and transportation of steel pipes of large diameter and heavy weight in narrow space such as in a tunnel.

REFERENCE SIGNS

1. Roller carrier base; 2. Roller; 3. Roller bearing; 4. Driving roller rotation electric motor; 5. Roller carrier hydraulic jack; 6. Roller carrier rail wheel; 7. Roller carrier rail wheel electric motor; 8. Connection shaft of roller carrier hydraulic jack; 9. Hinge shaft.

EMBODIMENTS

With the combination of the following drawings, the invention is described in details.

The invention will be further described in more details and the purposes, the technical solution and the advantages of the invention will be more apparent with the combination of the following drawings and embodiments. It shall be understood that the embodiments described herein are only used for explaining the invention but do not limit the invention.

Figure 1:
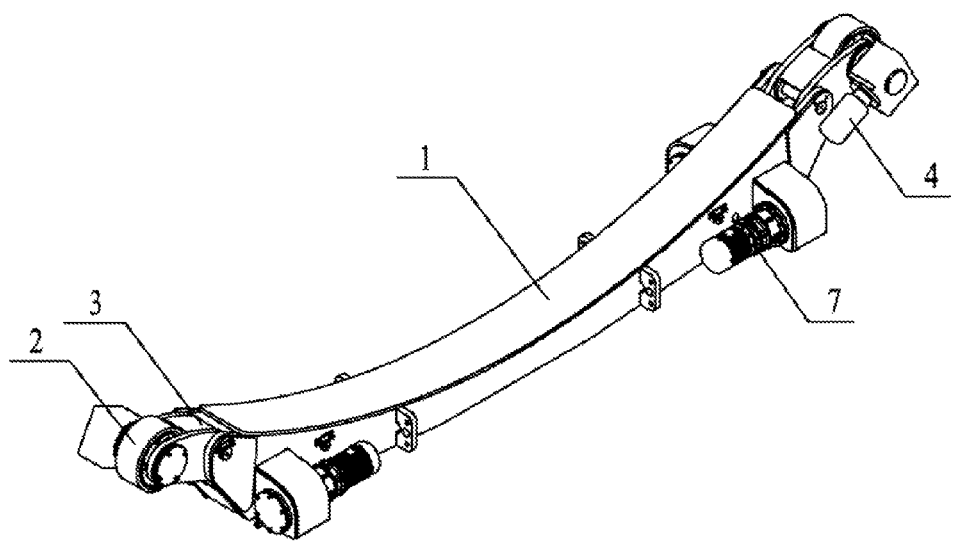
FIG. 1 is a structure schematic of driving roller carrier of the invention.
Figure 2:
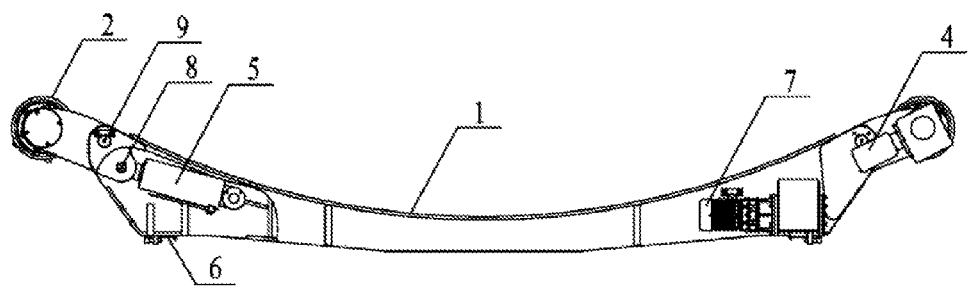
FIG. 2 is a front view of FIG. 1.
Figure 3:
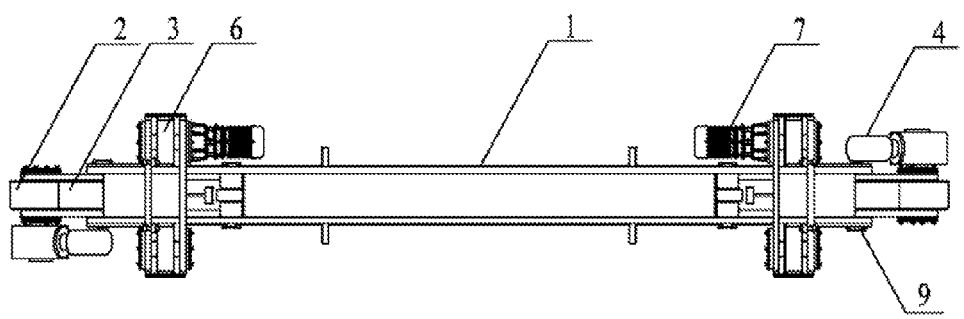
FIG. 3 is a bottom view of FIG. 1.
Figure 4:
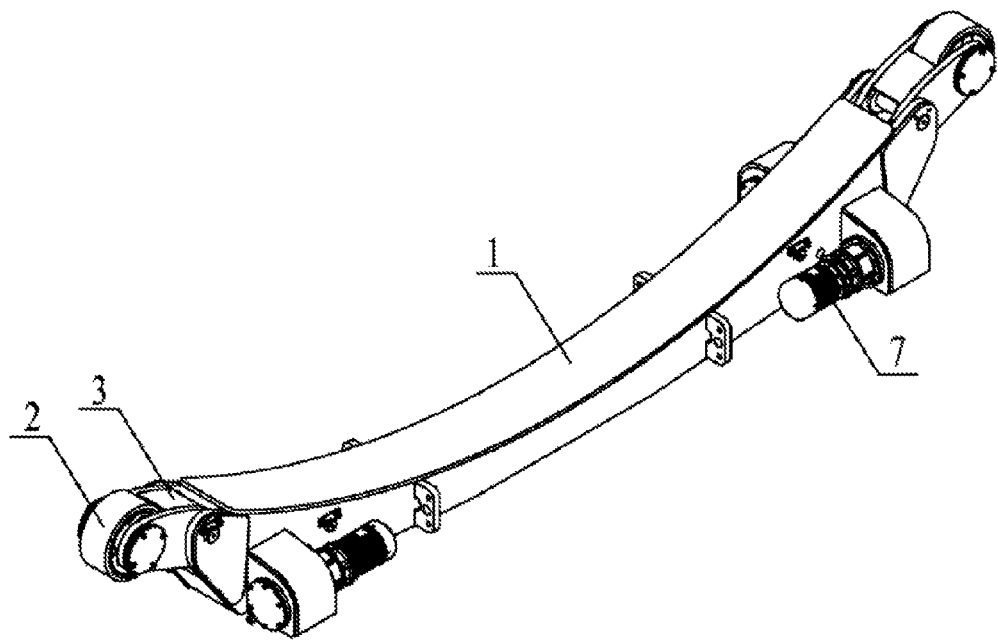
FIG. 4 is structure schematic of driven roller carrier of the invention.
Figure 5:
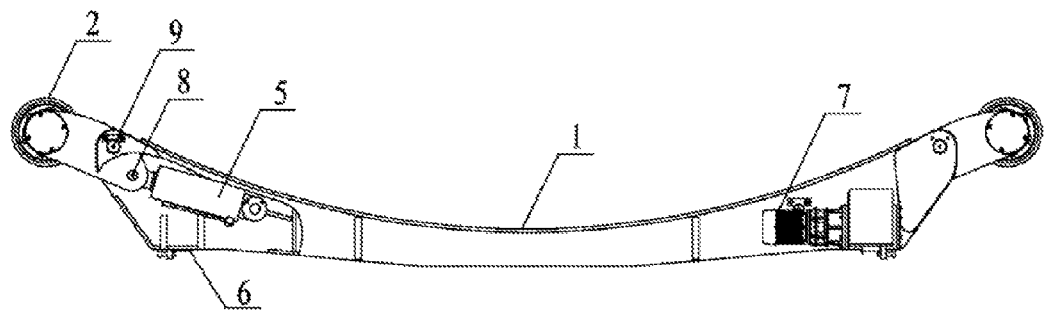
FIG. 5 is a front view of FIG. 4.
Figure 6:
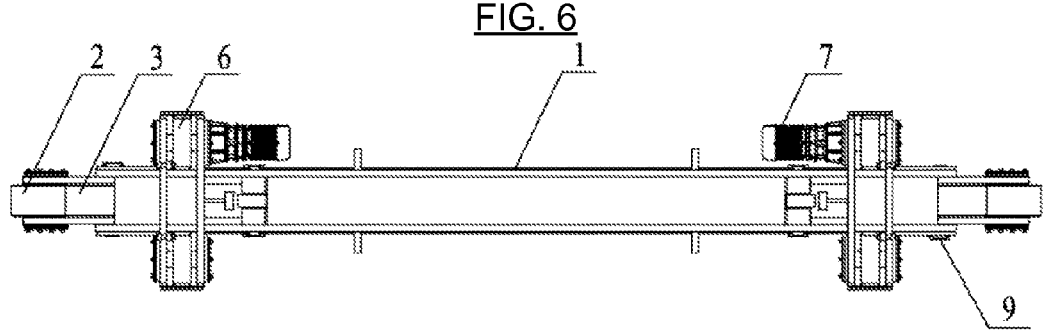
FIG. 6 is a bottom view of FIG. 4

An adjustable roller carrier as shown in FIG. 1-FIG. 6, among which FIGS. 1-3 are driving roller carrier, FIGS. 4-6 are driven roller carrier. An adjustable roller carrier comprising roller carrier base 1, roller 2 and electric motor speed reducing driver, wherein both ends of the roller carrier base 1 are each articulated with a roller bearing 3 and a roller carrier hydraulic jack 5, among which roller bearing 3 is the triangular articulated structure, roller carrier hydraulic jack 5 is articulated with roller bearing 3, roller 2 is installed on the said roller bearing 3. The upper surface of said roller carrier base 1 is a concave arc, i.e. the middle is lower than the two ends and gradually rising from the middle to the ends. The roller carrier base 1 is hollow in design, the roller carrier hydraulic jack 5 is installed inside the roller carrier base 1, and the jack 5 is driven by external electric hydraulic pump and equipped with relevant hydraulic valve or electromagnetic valve. This kind of structure is able to save installation space, and more suitable for the roller carrier in this example to be applied to the construction site with limited space such as in a tunnel; or the jack 5 is installed inside the roller carrier base 1, the jack 5 is connected with electric hydraulic pump and hydraulic valve inside the roller carrier base 1 and equipped with relevant contactor or electromagnetic valve which is controlled by remote controller. There is also roller carrier rail wheel 6 installed through bolts at both ends of the bottom of the roller carrier 1. Roller carrier rail wheel motor 7 is installed on the rail wheel 6 connected with motor speed reducing driver. The roller carrier can be divided into driving roller carrier or driven roller carrier. When the roller carrier is driving roller carrier, driving roller rotation motor 4 is installed on both ends or one end of the roller 2. The driving roller rotation motor 4 is the servo motor or frequency conversion motor with encoder closed-loop feedback controller.

When the roller carrier is being used, the driving roller carrier and the driven roller carrier shall be placed in parallel with certain distance, and the weldment placed on driving roller carrier base and driven roller carrier base. The electromagnetic valve is controlled by its remote controller and thus electric hydraulic pump is controlled to extend or shorten the roller carrier hydraulic jack 5. The specific method is that roller carrier hydraulic jack 5 drives the roller bearing 3 via connection shaft 8 of the roller carrier hydraulic jack to move, and the roller bearing 3 rotates around the hinge shaft 9 so that the roller bearing 3 drives the roller 2 to rotate around roller carrier base 1. The driving roller rotates around the end port of the driving roller carrier base and contacts the surface of the weldment; at the same time the driven roller contact the weldment surface by rotating around the driven roller carrier end port. Since each roller 2 is driven separately by one hydraulic jack 5, the synchronous control is able to be realized so that these two driving rollers and two driven rollers can rotate with the same degree at the same time, thus changing the center-to-center distance of these two driving rollers and two driven rollers and the weldment will also move upward or downward correspondingly. With the same method, it is able to realize the asynchronous control of the driving roller or driven roller by rotating the roller 2 with different angles, it is able to satisfy the requirements of machining the non-cylindrical weldment like conic body. Since driven roller carrier is to supporting the weldment auxiliary, the driven roller rotation electric motor is not necessary to set and it only needs to start the driving roller rotation motor 4 which drives the driving roller to rotate around its shaft and thus the weldment will rotate on the driving roller carrier and the driven roller carrier at the same time, satisfying the machining requirements for steel pipes with large diameter and heavy load on site.

According to the weldments with different diameters, it only needs to adjust the rotation amplitude of roller 2, which is convenient and fast to align the weldment. Furthermore, more than two roller carriers can be selected at the same time for machining depending on actual needs.

The above-mentioned are only preferred embodiments of the invention and do not limit the invention. Any modification, equal replacement and improvement made within the spirit and the principle of the invention shall be comprised in the protection scope of the invention.

What is claimed is:
1. An adjustable roller carrier, comprising: a hollow roller carrier base having opposed ends and an upper surface, wherein the upper surface of the hollow roller carrier base comprises a concave arc from a middle of said roller carrier base to each of the opposed ends a roller at each of the opposed ends of the hollow roller carrier base; and a motor speed reducing driver, wherein: each opposed end of the hollow roller carrier base includes a roller bearing and a roller carrier hydraulic jack, the roller bearing being connected to the hollow roller carrier base by a first shaft, each of the roller carrier hydraulic jacks is connected to a first end of a corresponding roller bearing by a second shaft and to the hollow roller carrier base and is configured to rotate the roller bearing around the first shaft, and each of the rollers is mounted on a second end of a corresponding one of the roller bearings, the first shaft (i) being spaced apart from the second shaft and the roller and (ii) functioning as a hinge for rotating the roller bearing, and the adjustable roller carrier is movable and adapted for welding and transportation of steel pipes in a restricted space.

2. The adjustable roller carrier according to claim 1, wherein each of said roller bearings comprises a triangular articulated structure.

3. The adjustable roller carrier according to claim 1, wherein said adjustable roller carrier is a driving roller carrier, and said adjustable roller carrier further comprises a driving roller rotation motor that drives at least one of the rollers.

4. The adjustable roller carrier according to claim 1, wherein each of said roller carrier hydraulic jacks is inside the hollow roller carrier base and includes a corresponding hydraulic valve or electromagnetic valve, and said adjustable roller carrier further comprises an external electric hydraulic pump that drives said roller carrier hydraulic jacks.

5. The adjustable roller carrier according to claim 1, wherein each of said roller carrier hydraulic jacks is inside the hollow roller carrier base, the adjustable roller carrier further comprises an electric hydraulic pump inside the hollow roller carrier base, the electric hydraulic pump is connected to the roller carrier hydraulic jacks and a hydraulic valve inside the hollow roller carrier base, each of the roller carrier hydraulic jacks further includes a contactor or electromagnetic valve, and the adjustable roller carrier further comprises a remote controller that controls the contactors or electromagnetic valves.

6. The adjustable roller carrier according to claim 1, further comprising roller carrier rail wheels on opposed ends of a bottom of the hollow roller carrier base, and a roller carrier rail wheel electric motor installed on each of said roller carrier rail wheels.

7. The adjustable roller carrier according to claim 3, wherein said driving roller rotation motor comprises a servo motor or frequency conversion motor with an encoder closed-loop feedback controller.

8. The adjustable roller carrier according to claim 3, further comprising roller carrier rail wheels on opposed ends of a bottom of the hollow roller carrier base, and a roller carrier rail wheel electric motor installed on each of said roller carrier rail wheels.

9. The adjustable roller carrier according to claim 5, further comprising roller carrier rail wheels on opposed ends of a bottom of the hollow roller carrier base, and a roller carrier rail wheel electric motor installed on each of said roller carrier rail wheels.

10. The adjustable roller carrier according to claim 1, wherein said adjustable roller carrier is a driven roller carrier.

11. The adjustable roller carrier according to claim 4, further comprising a remote controller that controls the external electric hydraulic pump.

12. The adjustable roller carrier according to claim 1, wherein rotating the roller bearing around the first shaft changes a height of a corresponding roller and a horizontal center-to-center distance of the rollers.

13. The adjustable roller carrier according to claim 1, wherein each said opposed end of the hollow roller carrier base is articulated with said roller bearing and said roller carrier hydraulic jack.

14. The adjustable roller carrier according to claim 1, wherein the restricted space is a tunnel.

* * * * *